3,226,318
SEWAGE TREATMENT PROCESS WITH CONSOLI-
DATING OF SEPARATED SEWAGE SLUDGE
Josef Schick, Gewannweg 29, Obersdorf uber
Siegen, Germany
No Drawing. Filed Nov. 21, 1962, Ser. No. 239,321
Claims priority, application Germany, Nov. 22, 1961,
S 76,789
1 Claim. (Cl. 210—10)

The invention relates to a process for consolidating aqueous sludge having high solids contents and low water contents.

Most modern sewage treatment processes lead to sludges from which most of the water has been removed but which have not been sufficiently consolidated to be suitable, in their "as-yielded" consistency, for transportation, storage or further processing as solids. If further consolidation of the sludge is required, much time and space are required for the sludge to be dried in drying beds, or else further dewatering treatment must be given, with the result that more power must be consumed.

It is an object of this invention to considerably simplify and cheapen the required consolidation of such sludges and to enable the consolidated sludges to be used economically.

According to the invention, therefore, water-soluble polymerisable or condensable monomers are added to the sludge, then polymerised or condensed, the solids and water constituents of the sludge being locked into the polymerisation or condensation product and the sludge being permanently consolidated. This process takes much less time than the conventional drying processes, with the result that the area required for final preparation of the sludge yielded is reduced correspondingly. Another advantage of the invention is that the consolidated sludges have a number of possible uses, for instance, as an insulating material or sealant or as a building material. The novel process is of use with all sludges, whatever the nature of the solids contained therein.

In a preferred form of the process according to the invention, the timing of the polymerisation or condensation is controlled in manner known per se by an addition of accelerating or retarding compounds. Advantageously, water-soluble derivatives of acrylic acid or low-molecular weight aldehydes together with benzene derivatives, for instance, phenol, are used as polymerisable or condensable monomers.

The polymerisable or condensable water-soluble or water-dispersable compounds, preferably while in the monomeric state, are added to the aqueous sludge in solutions or dispersions of varying concentration, with or without foaming agents. The mixture is allowed to freeze, possibly in moulds, with an addition of substances which initiate the consolidation process and which are known as "starters," and with an addition of substances—usually accelerators—which control the timing of the process; the organic and inorganic solids contained in the sludge and the water contained therein are locked into the polymerisation or condensation product. Shaped or unshaped compositions in the form of frozen structures or foams are yielded, the cavities of the structures or foams being full of water while the cavity or cell walls have the solids polymerised or condensed into them. These solid compositions are reversible system, yielding water by evaporation and absorbing water.

The cell walls take the form of synthetic resin gels if a two-component aqueous solution of monomeric derivatives of acrylic acid, for instance, a mixture of acryl-amide, and N,N'-methylene bisacryl-amide the commercial product known as AM–9 of the American Cyanamid Company is used. To start polymerisation, there are added to these solutions or dispersions in known manner catalysts, such as β-dimethyl amino propionitrile which forms free radicals, accelerators such as peroxides or per salts, and inhibitors, such a ferricyano compounds, which control the timing of polymerisation. Of course, only monomers which lead to non-adhesive polymers are used for polymerisation. The polymers used, together with the polymerised sludge ingredients and the water present in the sludge, should lead to at least compact compositions which can be transported without returning to a thixotropic condition.

To produce consolidation by condensation, for instance, a phenol-formaldehyde solution can be added to the aqueous sludges, whereafter condensation can be started by a further addition of formaldehyde or of some suitable curing agent. Preferably, the resins used for these condensations are of the kind which can receive a very wide variety of fillers. Foaming agents or formable resins can also be added as in the preparation of foamed substances; the solids contents of the sludge are, in the application according to the invention, locked into the foam upon the completion of condensation. For instance, by means of a foamable urea-formaldehyde solution from which, for instance, an insulating material is marketed by the Badische Anilin- and Sodafabrik under the registered trade-mark "Iporka," and by means of the "Iporka-Schaummittel W," sludges could be consolidated to a consistency which was completely satisfactory upon the conclusion of condensation. However, these condensation processes require longer reaction times than do polymerisation processes. Also, heat may occasionally be required to start the condensation process. It is therefore more economical to use polymerisable substances for the application according to the invention instead of expensive chemicals for the consolidation of sludges in respect of which the only need is, as a rule, removal with maximum efficiency.

In the consolidation according to the invention of sediments and sludges which are precipitated or separated from turbid waste waters and which are present in as anhydrous a form as possible, the specific weight of the ingredients of the sludge has no effect on the inclusion of such ingredients in the polymers or condensates. Inorganic substances, including weighted sediments, and organic substances, and precipitations such as are yielded, for instance, from the waste waters of tanneries and leather factories, residues of hide and flesh, animal hairs and organic tanning agents, can be included in the polymerising and condensing agents.

However, the water contents of sludges are very important. The quantity of polymerisation and condensation agents must be controlled in accordance with the water contents of the particular sludge which it is required to treat. To keep the quantities of such agents low, a thorough preliminary dewatering treatment must be given to the sludge if the consolidation process is to be economical. The following example is intended to give further particulars about this procedure.

*Example 1*

15 kg. of a 20% aqueous solution of AM–9, made by the Amercian Cyanamid Company, to which 120 g. of catalyst and 40 cc. of a 10% ferricyano-potassium solution had been mixed, were added to 100 kg. of a sludge containing 62% of water. Also, a solution of 150 g. of ammonium persulphate dissolved in one litre of water was added to the sludge with thorough mixing. At the end of one hour the mixture had frozen to a compact composition which could readily be transported.

If instead of 15 kg. of a 20% solution 15 kg. of a 25% solution of AM–9 containing 150 g. of catalyst and 10 cc.

of a 10% ferricyano-potassium solution were added and a solution of 188 g. of ammonium persulphate dissolved in 1 litre of water was simultaneously added, the resulting composition was already solid.

This example shows that a quantity of at least 4% of AM-9 is necessary to consolidate a sludge having 62% aqueous contents. If the quantity of AM-9 added is increased to above 5%, for instance, to 15%, the resulting products are solid but, although they are very hard at the completion of polymerisation they are shattered by slight vibrations and then look like powdered glass. In this respect it is immaterial whether the sludges are of organic or inorganic origin.

*Example 2*

Instead of the polymerisable AM-9 used in Example 1, 20 kg. of a 40% phenol-formaldehyde solution were added to 100 kg. of the same sludge, whereafter 2 kg. of a 40% formalin solution were added. At the end of about 8 hours a condensation product was yielded of a consistency adequate for transportation to a dump.

Consequently, and because of the relationships hereinbefore set forth, very good results were achieved when the process according to the invention was used with those sludges which are yielded by the process and apparatus disclosed by the applicant's copending German patent applications S 75,695 and S 76,625.

I claim:

In a sewage treatment process in which a sewage sludge containing sewage solids and about 60% water has been separated from the sewage, the steps of consolidating said sewage sludge comprising adding to said sludge conisting essentially of said sewage solids and water a substance selected from the group consisting of water-soluble polymerizable monomers and catalysts for said monomers and water-soluble condensable monomers and curing agents for said monomers and polymerizing or condensing said monomers to lock the solids and water constituents of the ludge into the resulting polymerization or condensation product and produce a permanently consolidated sludge.

References Cited by the Examiner

UNITED STATES PATENTS

| | | | |
|---|---|---|---|
| 232,756 | 9/1880 | Pollard | 71—12 |
| 2,338,799 | 1/1944 | Buckley et al. | |
| 3,021,298 | 2/1962 | Rakowitz | 61—1 X |
| 3,073,693 | 1/1963 | Nelsson et al. | 71—13 |

OTHER REFERENCES

"Sewage-Treatment Works," Keefer, First Edition, 1940, McGraw-Hill, New York, pp. 416–426, 435–444 and 468 relied on.

MORRIS O. WOLK, *Primary Examiner.*